US006572953B1

(12) United States Patent
Quartz

(10) Patent No.: US 6,572,953 B1
(45) Date of Patent: Jun. 3, 2003

(54) TRANSFER MATERIAL WITH HEAT ACTIVATABLE ADHESIVE LAYER

(75) Inventor: William L. Quartz, Pulaski, NY (US)

(73) Assignee: Felix Schoeller Technical Papers, Inc., Pulaski, NY (US)

( * ) Notice: Subject to any disclaimer, the term of this patent is extended or adjusted under 35 U.S.C. 154(b) by 0 days.

(21) Appl. No.: 09/564,442

(22) Filed: May 4, 2000

(51) Int. Cl.[7] ............................ B32B 27/14; B32B 3/00

(52) U.S. Cl. ....................... 428/195; 428/323; 428/347; 428/914

(58) Field of Search ................................ 428/195, 212, 428/323, 500, 347, 914

(56) References Cited

U.S. PATENT DOCUMENTS

| | | | | | |
|---|---|---|---|---|---|
| 5,981,045 | A | * | 11/1999 | Kuwabara et al. | 428/212 |
| 6,004,718 | A | | 12/1999 | Shinohara | |
| 6,037,050 | A | * | 3/2000 | Saito et al. | 428/304.4 |
| 6,146,712 | A | * | 11/2000 | Maeda et al. | 427/493 |
| 6,391,428 | B1 | * | 5/2002 | Ueno et al. | 428/195 |

* cited by examiner

*Primary Examiner*—Cynthia H. Kelly
*Assistant Examiner*—B. Shewareged
(74) *Attorney, Agent, or Firm*—Cook, Alex, McFarron, Manzo, Cummings & Mehler, Ltd.

(57) ABSTRACT

A transfer material for the ink-jet printing process comprising a support and a heat-activatable polymer layer wherein the polymer of the polymer layer is a mixture of nonionic water soluble polyethylene oxide polymers with the general formula $$H—[—O—CH_2—CH_2—]_nOH,$$

and wherein the degree of polymerization n is in the range of from 1,000 to 200,000.

10 Claims, No Drawings

TRANSFER MATERIAL WITH HEAT ACTIVATABLE ADHESIVE LAYER

This invention relates to an ink-jet printable transfer material having a heat-activatable adhesive layer.

Transfer materials have been available for many years and serve the decoration of goods. Typically they consist of a polymeric or wax film which is formed on a support. An image is printed on the film and subsequently the film is transferred from the support to a substrate usually by applying pressure or heat to the back of the support.

FR 2 715 607 B1 describes a method for decorating a substrate with an image which, at first, has been printed on a transfer material. A digital image from a conventional video camera is printed using an ink-jet printer onto the transfer material which comprises a plastic support and a heat sensitive adhesive coating onto which the ink is printed. The printed side of the transfer material is placed in contact with the substrate and heat is applied to activate the support. The plastic support can be removed once the adhesion between the coating and the substrate is greater than that between the coating and the plastic support. FR 2 715 607 does not disclose the composition of the coating which accepts the printing ink. However, non-heat-sealable coatings are essentially continuous films deposited from a polymer solution in an organic solvent or water, or from a dispersion of a polymer in water with emulsifiers.

WO 98/35840 describes a transfer film for transferring an ink comprising at least one liquid component, the film comprising a porous matrix of particles of a heat activatable adhesive bound together by an absorber, the absorber being at least partly soluble in the said liquid component within the porous matrix, and the absorber preferably being within the pores of the porous matrix. The absorber has the double function of binding the matrix of heat activatable adhesive and at least partially absorbing the liquid component of the ink.

The absorber is a water soluble or hydrophilic absorber, i.e. an acrylate copolymer, a cellulose ether and/or a polyvinyl pyrrolidone. However, the printed image on the transfer material of WO 98/35840 shows a grainy performance.

It is therefore an object of this invention to provide an improved image transfer material which does not show the above-mentioned disadvantages. The improved printable transfer material shall provide high color densities, even image quality, short drying time and, in particular, good adhesion on the permanent carrier.

This object is achieved by a printable transfer material comprising a support and a heat-activatable polymer layer wherein the polymer of that polymer layer is a mixture of nonionic water-soluble poly(ethyleneoxide)polymers with the general formula $$H—[—O—CH_2—CH_2—]_nOH,$$

wherein the degree of polymerization n is in the range of from 1,000 to 200,000, in particular, from about 2,000 to 180,000.

It was found that the polymer used in the present invention can serve the dual function of an absorber for the ink and as a heat activatable adhesive. It is assumed that this fact has a profound effect on the print quality of the image. The coating comprising that polymer is applied in the form of a homogeneous solution of single polymers, whereas the transfer film of WO 98/35840 is obtained by applying a non-homogenous dispersion of two non-miscible polymers. In the prior art document only the absorber polymers are capable of absorbing the ink and the colorant, while the heat-activatable adhesive will not.

The transfer material of the invention results in an improved image quality and improved optical density of the print.

Although not necessary for the purpose of the present invention, the polymer layer may contain additional polymers. The polymer layer may contain pigments such as silica, alumina, aluminum hydroxide, calcium and/or magnesium containing compounds. By the presence of these or other pigments known in the art the ink absorption may be improved and bleed of the ink is avoided or at least decreased. The ratio of the polyethylene oxide to the pigment is from 20:1 to 1:1, preferably from 15:1 to 5:1, based on the weight of the components.

The polymer layer may contain dye fixing agents such as quaternary polyammonium salts, cationic polyamines, cationic polyacryl amides or cationic polyethylene amides. Particularly preferred are polyquaternary amines. The amount of the dye fixing agent should not exceed 5% by weight, based on the weight of the dry layer. Preferably, the amount of the dye fixing agent is in the range of 0.1 to 3.0% by weight, based on the dry weight of the layer.

The polymer layer may contain additional additives such as wetting agents, dispersing agents or colorants.

Suited as a support are resin coated papers or plastic films. The thickness of the support generally is 1 to 500 $\mu$m, preferably 5 to 200 $\mu$m. Examples for resin coated papers include papers which are coated with polyolefins or polyesters. Suitable plastic films for the purposes of the present invention include, for example, polyester films or polypropylene films. Additionally, films made of polycarbonates, polyamides, polystyrene, cellulosic esters and metals are suited for the purposes of the present invention.

The following examples shall further explain the invention.

EXAMPLE 1

Onto a polyester film with a thickness of 70 $\mu$m a heat activatable polymer layer of the following composition was applied:

| | |
|---|---|
| Polyethylene oxide | 750 g |
| Water | 6375 g |
| Isopropanol | 375 g |
| Wetting agent | 9 g. |

All indications of weight refer to the product in trade. The coating weight of the dried polymer layer was 24 g/m$^2$.

EXAMPLE 2

Onto a polyester film with a thickness of 70 $\mu$m a heat activatable polymer layer of the following composition was applied:

| | |
|---|---|
| Polyethylene oxide | 750 g |
| Water | 6375 g |
| Isopropanol | 375 g |
| Silica | 83 g |
| Dye fixing agent | 4.5 g |
| Wetting agent | 9 g. |

All indications of weight refer to the product in trade. The coating weight of the dried polymer layer was 28 g/m$^2$.

EXAMPLE 3

Onto a polyester film with a thickness of 70 μm a heat activatable polymer layer of the following composition was applied:

| | |
|---|---|
| Polyethylene oxide | 750 g |
| Water | 6375 g |
| Isopropanol | 375 g |
| Silica | 185 g |
| Dye fixing agent | 9.5 g |
| Wetting agent | 9 g. |

All indications of weight refer to the product in trade. The coating weight of the dried polymer layer was 13 g/m$^2$

COMPARATIVE EXAMPLE V1

In order to compare the characteristics of the transfer material according to the invention the following composition which is indicated on page 8 of WO 98/35840 was applied to a 50 μm polyester film carrier.

| Material | Percentage | Function |
|---|---|---|
| Vinyl copolymer dispersion (Ucar ® WBV110) | 22.81 | Heat activated adhesive |
| Hydroxypropyl cellulose (Klucel ® E) | 7.61 | Heat softenable binder and ink absorber |
| Supronic ® B75 | 0.38 | Defoamer |
| Lumiten ® A-FK | 0.74 | Wetting agent |
| Ammonia, S.G. = 0.880 | 0.40 | Neutraliser for coatability |
| Water | 68.06 | Diluent |
| Total | 100.00 | |

The coating weight of the dried polymer layer was 24 g/m$^2$.

COMPARATIVE EXAMPLE V2

In order to compare the characteristics of the transfer material according to the invention the following composition which is indicated on page 11 of WO 98/35840 was applied to a 50 μm polyester film carrier.

| Material | Percentage | Function |
|---|---|---|
| Vinylchloride/vinyl-acetate copolymer Vinnol ® Dispersion CE 35 | 79.5 | Dispersed Phase/Matrix |
| Glascol ® LS41 | 14.1 | Soluble Absorber |
| Boric Acid | 1.93 | Acidulant/Neutraliser |
| Ammonia Solution, S.G. = 0.880 | 1.02 | Neutraliser and Solubiliser |
| Laekoll ® D | 3.22 | Thickener |
| Lumiten ® IRA | 0.20 | Wetting Agent |

The coating weight of the dried polymer layer was 23 g/m$^2$.

The samples of Examples 1 to 3 and Comparative Examples V1 and V2 where printed on with a Hewlett Packard HP 690 ink-jet printer with a test image including the colors black, cyan, magenta and yellow. Subsequently, the resulting transfer materials were applied at a temperature of 105° C. on a white polyethylene coated paper. Accordingly all images had the same support material. The support of the transfer material is removed and color density, evenness of the ink application, drying time and adhesion of the resulting materials were tested.

Color Density

Color density was determined with a Gretag Densitometer Typ 186 D with the colors black, cyan, magenta and yellow.

Evenness of Color Application

The evenness of color application has been assessed visually at the black areas of the test image and was marked with marks 1 to 6 (very good to very bad).

Drying

The time was measured from application of the ink until the time, smudge of the ink was no more possible.

TABLE 1

| | Color density | | | |
|---|---|---|---|---|
| Example | black | cyan | magenta | yellow |
| 1 | 1.42 | 2.05 | 2.42 | 1.80 |
| 2 | 1.47 | 2.10 | 2.48 | 1.86 |
| 3 | 1.51 | 2.13 | 2.50 | 1.93 |
| V1 | 0.51 | 2.03 | 2.15 | 1.76 |
| V2 | 0.49 | 1.98 | 2.10 | 1.74 |

TABLE 2

| Example | color application | drying(seconds) |
|---|---|---|
| 1 | mark 1 | 210 |
| 2 | mark 1 | 195 |
| 3 | mark 1 | 191 |
| V1 | mark 5 | 315 |
| V2 | mark 5 | 319 |

Adhesion of the samples of Examples 1 to 3 was very good (the polymer layer was peelable only in very small parts). As to the sample of the Comparative Examples V1 and V2 adhesion was good (it was only possible to peel away small parts of the polymer layer).

The examples show that the polymer layer of the present invention provides an excellent image transfer material with excellent color densities, excellent color evenness and very good adhesion.

What I claim is:

1. A transfer material for the ink-jet printing process comprising a support, and a heat-activatable adhesive polymer layer with a pigment therein and which is releaseable from said support, wherein the polymer of said polymer layer comprises a nonionic water soluble polyethylene oxide polymer with the general formula $$H—[—O—CH_2—CH_2—]_nOH,$$

the ratio of said polymer to pigment being from 20:1 to 5:1 based on the weight of the components and said polymer being a mixture of degrees of polymerization n in the range of from 1,000 to 200,000 which renders said polymer layer adhesive, releasable from said support, heat activatable and absorbent to the ink jet.

2. A transfer material according to claim 1, wherein the degree of polymerization n is from 2,000 to 180,000.

3. A transfer material according to claim 1, wherein the polymer layer includes a dye fixing agent.

4. A transfer material according to claim 1, wherein the support material is a resin coated paper.

5. A transfer material according to claim 1, wherein the support material is a plastic film.

6. A transfer material according to claim 1, wherein the polymer of the polymer layer consists essentially of said polyethylene oxide.

7. A transfer material according to claim 6, wherein the degree of polymerization n is from 2,000 to 180,000.

8. A transfer material according to claim 6, wherein the polymer layer includes a dye fixing agent.

9. A transfer material according to claim 6, wherein the support material is a resin coated paper.

10. A transfer material according to claim 6, wherein the support material is a plastic film.

* * * * *